United States Patent
Hasegawa et al.

(10) Patent No.: US 6,861,111 B1
(45) Date of Patent: Mar. 1, 2005

(54) ADDITIVE AND INKJET RECORDING MEDIUM USING ADDITIVES

(75) Inventors: Makoto Hasegawa, Tokyo (JP); Noriko Kumazawa, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/937,099

(22) PCT Filed: Feb. 10, 2000

(86) PCT No.: PCT/JP00/00752

§ 371 (c)(1),
(2), (4) Date: Sep. 20, 2001

(87) PCT Pub. No.: WO00/59980

PCT Pub. Date: Oct. 12, 2000

(30) Foreign Application Priority Data

Mar. 31, 1999 (JP) ............................... 11-090970

(51) Int. Cl.$^7$ ................................. B41M 5/00
(52) U.S. Cl. ................. 428/32.21; 428/32.14; 428/32.26; 428/32.3
(58) Field of Search .......................... 428/32.14, 32.21, 428/32.26, 32.3, 195, 32.1

(56) References Cited

U.S. PATENT DOCUMENTS

| | | | |
|---|---|---|---|
| 3,954,680 A | | 5/1976 | Jansma |
| 5,137,773 A | | 8/1992 | Malhotra |
| 5,683,784 A | * | 11/1997 | Nakao et al. ............... 428/195 |
| 5,882,755 A | | 3/1999 | Igarashi et al. |
| 6,150,289 A | * | 11/2000 | Chen et al. .................. 501/148 |
| 6,277,498 B1 | * | 8/2001 | Endo et al. ................. 428/500 |

FOREIGN PATENT DOCUMENTS

| | | | | |
|---|---|---|---|---|
| EP | 0717146 A2 | * | 6/1996 | .......... D21H/17/55 |
| JP | 0147057 A | * | 6/1998 | ............ B41M/5/00 |
| JP | 10-147057 | | 6/1998 | |
| JP | 10-152544 | * | 6/1998 | ............ B41M/5/00 |

OTHER PUBLICATIONS

Translation document of JP 10–152544 (Kiyoshi et al).*
Patent Abstracts of Japan vol. 010, No. 355 (C–388), Nov. 29, 1986 & JP 61 152731 A (Dick Hercules KK), Jul. 11, 1986.
Patent Abstracts of Japan, Publication No. 63–162275 (Jul. 5, 1988) Jujo Paper Co. Ltd., Kojima Yutaka et al., "Sheet For Ink Jet Recording".
Patent Abstracts of Japan, Publication No. 10–157283 (Jun. 16, 1998) Mitsubishi Paper Mills Ltd., Furukawa Akira et al., "Material To Be Recorded For Ink Jet".
Patent Abstracts of Japan, Publication No. 09–109544 (Apr. 28, 1997) Mitsubishi Paper Mills Ltd., Suzaki Katsumitsu et al., "Recording Sheet For Ink Jet".
Patent Abstracts of Japan, Publication No. 09–048173 (Feb. 18, 1997) Nichiban Co. Ltd., Maki Tadao et al., "Ink Jet Recording Sheet".
Patent Abstracts of Japan, Publication No. 06–340163 (Dec. 13, 1994) Mitsubishi Paper Mills Ltd., Furukawa Akira et al., "Ink Jet Recording Medium".
Patent Abstracts of Japan, Publication No. 10–147057 (Jun. 2, 1998) Senka KK, Yamanaka Tetsuo et al., "Additive For Ink–Jet Recording Paper".

* cited by examiner

Primary Examiner—Pamela R. Schwartz
(74) Attorney, Agent, or Firm—Millen, White, Zelano & Branigan, P.C.

(57) ABSTRACT

An additive which can improve the water resistance of a water-soluble dye with which an article has been dyed; and an ink-jet recording medium which contains the additive, is exellent in the water resistance and resolution of characters or images recorded thereon, and is suitable for multicolor recordeng. The additive is obtained by reacting a secondary amine, ammonia, an epihalohydrin, and a crosslinking agent as essential ingredients. The recording medium is obtained by causing the additive to be present on a surface and/or inner part of a base.

22 Claims, No Drawings

ABNORMAL US 6,861,111 B1

ADDITIVE AND INKJET RECORDING MEDIUM USING ADDITIVES

FIELD OF THE INVENTION

This invention relates to an additive having a cationic resin which can render a water-soluble dye water resistant as principal component, and to an inkjet recording medium comprising this additive in the surface and/or interior of a substrate.

BACKGROUND OF THE INVENTION

In inkjet recording, a coloured dye or coloured pigment dispersed, in an aqueous or non-aqueous solvent, is extruded as minute fine drops from one or more nozzles, and the liquid drops are made to form a desired character or image by electronic control on the recording medium.

As a recording medium employing this recording method, paper used for electrostatic transfer or ordinary paper used for writing can be used, but to obtain a good recorded image, the recording medium must have the following two sets of characteristics. The first set of characteristics is good ink absorption, ink drops adhering to the surface of the medium rapidly penetrate the interior of the medium, the image rapidly develops a dry appearance, and the image does not smudge on contact with the recording device, another medium or the hands. The second set of characteristics is that ink drops do not diffuse through the interior or surface of the medium more than is necessary, and dots recorded by the ink drops do not become too large or assume a distorted shape.

The coloured components used in the ink may be direct dyes, acidic dyes, basic dyes, reactive dyes, dispersion dyes or various pigments. Water-soluble dyes are most often used, but in the case of inkjet recording, there is usually a very serious problem insofar as the recorded image has poor water resistance. For example, when an image recorded by the inkjet recording method is taken outdoors, it may occur that of the image smudges due to rain and the recorded image can no longer be read. Alternatively, if the image is left for a long period of time under high humidity conditions, it may smudge and spoil the image quality.

Hence, to make the recorded image from inkjet recording water resistant, in Tokkai Sho 55-150396 (Koho), an invention is proposed wherein, after printing is performed using a water-based dye ink, a reagent is used which forms a lake with the dye to confer water resistance.

Various compounds that are ink water resistance-conferring agents and which can be first added to the ink-receiving layer of the inkjet recording medium, are also known. For example, JP,56-59239. (Koho) proposes a polycation polyelectrolyte, JP,61-68788 (Koho) proposes a weak acid salt of a polyallylamine, JP,60-49990 (Koho) proposes an ammonium polyalkylene polyamine dicyandiamide, JP,1-157884 (Koho) proposes chitosan, JP,6-92011 (Koho) proposes cation denaturation colloidal silica, while JP,6-92012 (Koho) proposes a copolymer of dimethylamine and epichlorohydrin, these compounds being added to the ink-receiving layer beforehand.

Besides the above-mentioned compounds, cationic resins such as dicyandiamide formaldehyde resin, diethylenetri-amine dicyandiamide ammonium chloride condensate, (meta)acryloyloxy-alkyl trialkylammonium chloride polymer, dimethyl diallylammonium chloride polymer, ethyleneimine polymers, diallylamine polymers and ammonia/epichlorohydrin/dimethylamine copolymers, are already known as an ink water resistance-conferring agents.

It is known that the aforementioned water-soluble cationic resins form complexes by bonding to anionic water-soluble direct dyes, acidic dyes, reactive dye, etc., thereby increasing the water resistance of water-soluble paints and preventing decoloring of yarn, cloth, etc. dyed with water-soluble paints.

However, if a solvent such as water is present in the environment when a complex with a dye molecule is made, the complex will displace easily from the dyed object, so these water-soluble cationic resins apparently have a low waterproofing effectiveness, and even if they were used as an ink jet recording medium, they did not give satisfactory recording quality.

It is therefore a first object of this invention to provide an additive having a cationic resin as its principal component which has a large effectiveness in improving the waterproof properties of an image colored or recorded with a water soluble dye. It is a second object of this invention to provide a recorded medium suitable for multicolor recording by the ink-jet recording method which not only addresses the problem of inadequate waterproofness of recorded characters and images, which was the defect of conventional inkjet recording media, but also improves resolution and color tone, provides a high resolution similar to that of a silver salt photograph, and gives little difference of hue of recorded characters or images compared to the hue of the dyes themselves which are currently used in ink.

DISCLOSURE OF THE INVENTION

This invention relates to an additive having a cationic resin as principal component, the resin being obtained by reaction of at least a secondary amine, ammonia, epichlorohydrin and a crosslinking agent, and to an ink-jet recording medium comprising this additive in the surface and/or interior of a substrate. The additive of this invention partly comprises a cationic resin having a crosslinked structure as principal component, hence even if a solvent such as water is present in the environment, a complex with a dye molecule cannot easily be displaced from a dyed object, and the durability of the image can be largely improved. The additive of this invention not only is effective in improving the durability of a water-based ink image, but also improves the resolution and color tone of the image. Therefore, by incorporating the additive having the cationic resin as principal component in the surface and/or interior of a substrate of a recording medium, an inkjet recording medium is obtained which not only has excellent waterproofness and gives little blurring of dots, but also has an identical coloring hue to that of the dye itself, and allows a high resolution, high quality image to be obtained.

DESCRIPTION OF THE PREFERRED EMBODIMENTS

The cationic resin of this invention has a secondary amine, ammonia, an epihalohydrin-compound and a crosslinking agent as required components, and can be obtained by their reaction. These components can be used independently, or a mixture of two or more of them may be used together.

The secondary amine used in this invention may be an aliphatic secondary amine, aromatic secondary amine or cyclic secondary amine, but an aliphatic secondary amine is to be preferred. Examples of aliphatic secondary amines are dimethylamine, diethylamine, dipropylamine, dibenzylamine, ethyl monomethylamine, methyl propylamine, butylmonomethylamine, methyl octylamine and methyl laurylamine. Of these dialkylamines, dimethylamine, diethylamine and ethyl monomethylamine are particularly desirable.

The ammonia used in this invention may be any of liquid ammonia, ammonia gas and aqueous ammonia solution, there being no particular limitation on the concentration of aqueous ammonia solution.

The epihalohydrin compound used in this invention may be epichlorohydrin, epiiodohydrin or epibromohydrin, epichlorohydrin being particularly preferred.

The crosslinking agent used in this invention may be any compound with two or more crosslinking functional groups such as aldehyde groups, epoxy groups and isocyanate groups, but compounds containing epoxy groups are to be preferred. Suitable examples are multifunctional epoxy compounds such as polyethylene glycol diglycidyl ether, polypropylene glycol diglycidyl ether, polytetramethylene glycol diglycidyl ether, polybutadiene diglycidyl ether, resorcinol diglycidyl ether, neopentylglycol diglycidyl ether, 1,6-hexanediol diglycidyl ether, bisphenol A diglycidyl ether, bisphenol F diglycidyl ether, bisphenol A polyethylene glycol diglycidyl ether, bisphenol A polypropyleneglycol diglycidyl ether, hydrated bisphenol A diglycidyl ether, hydroquinone diglycidyl ether, terephthalic acid diglycidyl ether, sorbitol polyglycidyl ether, polyglycerol polyglycidyl ether, pentaerythritolpolyglycidyl ether, diglyceroylpolyglycidyl ether, glycerolpolyglycidyl ether, and trimethylolpropane polyglycidyl ether., In the method of synthesizing the cationic resin, in JP,10-152544 (Koho), the order in which ammonia, amines and epihalohydrins may be made to react is disclosed. However, in the synthesis of the cationic resin of this invention, the epihalohydrin compound is gradually dripped in after first mixing the secondary amine and ammonia together in a reaction solvent, and the crosslinking agent is then added gradually. If the crosslinking agent and the secondary amine or ammonia are reacted together first, the reaction becomes uneven, and the target compound is not obtained.

In a preferred method of synthesizing the cationic resin of this invention, the secondary amine and ammonia are dissolved under temperature less than ordinal temperature in water or an organic solvent, for example, methanol, ethanol, 2-propanol, butanol, ethylene glycol, dioxane, dimethylformamide, 2-ethoxyethanol or dimethyl sulfoxide, the epihalohydrin is dripped in, the temperature of the reaction mixture is raised to 30–100° C., the crosslinking agent is added, and the reaction is performed for 10–20 hours.

A desirable mole ratio of monomer components in the cationic resin of this invention obtained by reaction of secondary amine, ammonia, epihalohydrin compound and crosslinking agent (secondary amine: ammonia: epihalohydrin compound: cross linking agent) is 1:(0.01–2):(0.5–2.5):(0.00005–0.05), and prefer-ably 1:(0.02–1):(0.8–2.2):(0.0001–0.01).

If the epihalohydrin compound is less than 0.5 mols, the secondary amine and ammonia cannot fully react with the epihalohydrin, so even if the compound obtained is used as a recording medium, it is difficult to obtain an ink jet recording target giving excellent water resistance of the recorded image. If the epihalohydrin compound is increased to exceed 2.5 mols, the resin obtained is difficultly soluble or insoluble in water, so it is unsuitable for manufacture of a recording medium in an aqueous system, and must be manufactured in a solvent system.

Alternatively, if the crosslinking agent is increased so that 0.05 mols are exceeded, although the reason is not clear, the desired compound cannot be obtained and it is difficult to use for manufacture of the recording medium of this invention. Conversely, if the crosslinking agent is reduced to less than 0.00005 mols, a good inkjet recording medium having good image water resistance cannot be manufactured.

The average molecular weight of the cationic resin of this invention is preferably 10,000–500,000, and more preferably 50,000–250,000 as a weighted mean. The reactivity with dye molecules falls if the weight average molecular weight is larger than 500,000, and the water resistance of the record image cannot be increased. Conversely, if the weight average molecular weight is less than 10,000, the reactivity with dye molecules increases too much, so when the resin comes in contact with ink, it reacts rapidly with the dye molecules in the ink to produce a precipitate, and in this case, the ink absorptivity of the recording medium falls.

Although the cationic resin of this invention is thought to be generated by the copolymerization of a secondary amine, ammonia, epihalohydrin compounds and a crosslinking agent, the molecular structure of this cationic resin has not yet been elucidated by the Inventor and others.

The state of the reaction system in the synthetic end phase of this cationic resin is solution-like or colloid-like, and the pH is 4–9. The color is light yellow, yellow, yellow brown, dark reddish-brown or brown.

The additive having the cationic resin of this invention as principal component (referred to hereafter simply as additive) may be the solution obtained when the synthesis of the cationic resin composition of this invention is complete, or alternatively it may be used in the colloid state as it is. The solvent or unreacted monomer may of course also be removed. Moreover, reagents such as a stabilizing agent or antiseptic can be added to the additive of this invention to the extent that they do not spoil the effectiveness of this invention.

As the substrate of the ink jet recording medium used in this invention, although paper is typical, cloth, nonwoven fabric, resin sheet, film, synthetic paper or metal sheet, etc. can be suitably chosen from the media on which ink jet recording is possible.

The ink jet recording medium containing the additive of this invention may be manufactured by immersing a substrate in an impregnating liquid containing the additive of this invention, then drying, or incorporating the additive of this invention in a coating liquid, applying the coating liquid to the substrate and drying so as to form a layer containing the additive of this invention on the surface of the recording medium; or when the substrate is paper, by mixing the additive with pulp and other ingredients in a substrate manufacturing step in the manufacture of paper, and these methods can also be combined. These methods may further be combined with known methods such as the impregnation method, coating method and internal addition method as appropriate.

The aforesaid impregnation liquid or coating liquid may contain further additives which are generally used, such as a filler or a binder, a pigment, a water retention agent, a water resistant agent, an optical whitening agent, pH regulator, defoaming agent, lubricant, antiseptic, surfactant or electrical conduction agent.

The drying method may be any of the usual methods, such as a steam heater, gas heater, infrared heater, electric heater, hot blast heater, microwave or cylindrical dryer. After drying, the product can be given a gloss if necessary by finishers such as a supercalender which is post processing, and a soft calender etc, which are finishing processing. In addition, it is also possible to perform general machining as may be convenient.

The ink jet recording medium obtained as described above may contain an arbitrary amount of the additive of this invention, the range of 0.1–25 g/m² being especially desirable. If the amount is less than 0.1 g/m², water resistance is inadequate when the medium is used in an inkjet recording device having a high ink discharge amount, and when the amount is higher than 25 g/m², the hue of the original dye and the hue of the recorded image shift so that image quality deteriorates.

The water-based ink used for ink jet recording normally comprises a water-soluble direct dye, acid dye, base dye or reactive dye as colorant together with water, lower alcohols or alkyl ethers of same as solvent. The lower alcohols are preferably polyhydric alcohols such as ethylene glycol, diethylene glycol, triethylene glycol or glycerol, and their alkyl ethers, and alkyl ethers of same are preferably low alkyl ethers such as diethylene glycol monomethylether, diethylene glycol monoethyl ether and triethylene glycol monomethyl ether. Other ink additives are for example antifungal agents, germicides, antioxidants, pH regulators, dispersants, rust preventives, chelating agents, surfactants or viscosity regulators, etc.

When the additive of this invention is used in an ink jet recording medium, anions of a dye molecule which is the coloring component in ink interacts with the additive of the invention so that a water-soluble dye becomes insoluble or difficultly soluble in water. As a result, an image recorded with high resolution as a picture or a character on the recording medium becomes water-resistant, does not smudge, and an excellent image with a small variation of hue is obtained.

Although the mechanism of the above interaction is not clear, the cationic resin obtained by copolymerization of the secondary amine, ammonia, epihalohydrin compound and crosslinking agent may form a properly developed network structure. After the reaction, this mixes with the solvent, but it is thought that after drying it becomes insoluble in water, and therefore has a far superior effect to that of the cationic resins of the prior art.

The additive of this invention can also prevent decoloring of yarn and cloth which were dyed using a water-soluble dye, and this is considered to be due to the above-mentioned reason.

EXAMPLES

Hereafter, this invention is further explained in detail by way of examples, but this invention is not limited to these. "Parts" and "%" refer to weight parts and wt % unless otherwise stated.

Synthesis Example 1

202.9 g dimethylamine (50%), 17.6 g of 0.24 wt % aqueous ammonia and 310 g water were introduced into a reaction vessel equipped with a stirrer, reflux condenser, dropping funnel and thermometer, and after stirring to dissolve the ingredients to obtain a homogeneous mixture, 238.6 g of an epichlorohydrin compound was dripped in using the dropping funnel. After addition was complete, the mixture was reacted at 70° C. for 15 hours. Next, 0.3 g bisphenol A propoxylate (1 propylene oxide/phenol) diglycidyl ether was added from the dropping funnel, and reacted at 90° C. for 5 hours to obtain a yellow liquefied aqueous solution containing 45% solids. The weight average molecular weight of the polymer obtained as found by high performance liquid chromatography was approximately 18,000. This will be referred to as Additive 1.

Synthesis Example 2

202.9 g dimethylamine (50%), 17.6 g of 24 wt % aqueous ammonia and 310 g water were introduced into a reaction vessel equipped with a stirrer, reflux condenser, dropping funnel and thermometer, and after stirring to dissolve the ingredients to obtain a homogeneous mixture, 238.6 g of an epichlorohydrin compound was dripped in using the dropping funnel. After addition was complete, the mixture was reacted at 70° C. for 15 hours. Next, 0.2 g neopentyl glycol diglycidyl ether was added from the dropping funnel, and reacted at 90° C. for 5 hours to obtain a light yellow aqueous solution containing 45% solids. The weight average molecular weight of the polymer obtained as found by high performance liquid chromatography was approximately 18,000. This will be referred to as Additive 2.

Synthesis Example 3

202.9 g dimethylamine (50%), 17.6 g of 24 wt % aqueous ammonia and 310 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 70° C. for 15 hours. Next, 0.2 g 1,6-hexanediol diglycidyl ether was added from the dropping funnel, and reacted at 90° C. for 5 hours to obtain a light yellow aqueous solution containing 45% solids. The weight average molecular weight of the polymer obtained as found by high performance liquid chromatography was approximately 18,000. This will be referred to as Additive 3.

Synthesis Example 4

202.9 g dimethylamine (50%), 17.6 g of 24 wt % aqueous ammonia and 310 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 70° C. for 15 hours. Next, 0.3 g hydrated bisphenol A diglycidyl ether was added from the dropping funnel, and reacted at 90° C. for 5 hours to obtain a light yellow aqueous solution containing 45% solids. The weight average molecular weight of the polymer obtained as found by high performance liquid chromatography was approximately 18,000. This will be referred to as Additive 4.

Synthesis Example 5

273.9 g ethylamine (50%), 17.5 g of 25 wt % aqueous ammonia and 314.4 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 80° C. for 15 hours. Next, 1.0 g bisphenol A propoxylate (1-propylene oxide/phenol) diglycidyl ether was added from the dropping funnel, and reacted at 90° C. for 5 hours to obtain a yellow liquefied aqueous solution containing 45% solids. The weight average molecular weight of the polymer obtained as found by high performance liquid chromatography was approximately 30,000. This will be referred to as Additive 5.

Synthesis Example 6

150.6 g dimethylamine (50%), 35.1 g of 20 wt % aqueous ammonia and 460.1 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 909 for 15 hours. Next, 1.0 g bisphenol A propoxylate (1-proplyene oxide/phenol) diglycidyl ether was added from the dropping funnel, and reacted at 90° C. for 5 hours to obtain a yellow liquefied aqueous solution containing 45% solids. The weight average molecular weight of the polymer obtained as found by high performance liquid chromatography was approximately 40,000. This will be referred to as Additive 6.

Synthesis Example 7

185.7 g dimethylamine (50%), 35.1 g of 25 wt % aqueous ammonia and 391.3 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 70° C. for 15 hours. Next, 1.0 g hydrated bisphenol A diglycidyl ether was added from the dropping funnel, and reacted at 60° C. for 7 hours to obtain a yellow liquefied aqueous solution containing 40% solids. The weight average molecular weight of the polymer obtained as found by high performance liquid chromatography was approximately 50,000. This will be referred to as Additive 7.

Synthesis Example 8

116.1 g dimethylamine (50%), 87.7 g of 25 wt % aqueous ammonia and 354.3 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 80° C. for 15 hours. Next, 2.0 g hydrated bisphenol A diglycidyl ether was added from the dropping funnel, and reacted at 80° C. for 8 hours to obtain a yellow liquefied aqueous solution containing 40% solids. The weight average molecular weight of the polymer obtained as found by high performance liquid chromatography was approximately 100,000. This will be referred to as Additive 8.

Comparative Synthesis Example 1

202.9 g dimethylamine (50%), 17.6 g of 24 wt % aqueous ammonia and 310 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 70° C. for 20 hours to obtain a yellow liquefied aqueous solution containing 45% solids. The weight average molecular weight of the polymer obtained as found by high performance liquid, chromatography was approximately 20,000. This will be referred to as Additive 9.

Comparative Synthesis Example 2

232.2 g dimethylamine (50%) and 317.4 g water were introduced into a reaction vessel equipped with a stirrer, reflux condenser, dropping funnel and thermometer, and after stirring to dissolve the ingredients to obtain a homogeneous mixture, 238.6 g of epichlorohydrin was dripped in using the dropping funnel. After addition was complete, the mixture was reacted at 80° C. for 15 hours to obtain a yellow liquefied aqueous solution containing 45% solids. The weight average molecular weight of the polymer obtained as found by high performance liquid chromatography was approximately 40,000. This will be referred to as Additive 10.

Comparative Synthesis Example 3

500.0 g monoallylamine hydrochloride (60%) and 1.5 g 2,2-azobis-(2-amidinopropane) dihydrochoride were introduced into a reaction vessel equipped with a stirrer, reflux condenser, dropping funnel and thermometer, and the mixture was reacted at 70° C. for 15 hours to obtain a 2,2-azobis-(2-amidinopropane) crosslinked compound of a monoallylamine polymer. Next, the product was diluted with 165.2 g water to obtain a yellow liquefied aqueous solution containing 45% solids. The weight average molecular weight of the polymer obtained as found by high performance liquid chromatography was approximately 18,000. This will be referred to as Additive 11.

Comparative Synthesis Example 4

700.0 g dicyandiamide (DCDA), 600.0 g diethylenetriamine (DETA), 400.0 g water and 100 g ammonium chloride ($NH_4Cl$) were introduced into a reaction vessel equipped with a stirrer, reflux condenser, dropping funnel and thermometer, and the mixture was reacted at 140° C. for 4 hours. Ammonia was violently emitted during the reaction. When emission of ammonia had subsided, heating was stopped, 600 g water was added, and 270 g hydrochloric acid was added to neutralize the reaction product giving a yellow liquefied aqueous solution containing 47% solids. The weight average molecular weight of the polymer obtained as found by high performance liquid chromatography was approximately 10,000. This will be referred to as Additive 12.

Application to Inkjet Recording Medium
Manufacture of Substrate of Inkjet Recording Medium 12 parts of kaolin as a filler, 0.1 parts of rosin sizing agent (commercial name: Sizepin NT-76: Arakawa Chemical Co.) and 0.3 parts of aluminum sulfate, 0.3 parts of cationized starch and 0.01 parts of yield enhancing agent (commercial name: Pearl Flock FR-C (Seiko Chemical Industries) were mixed with. 100 parts of a pulp slurry comprising broadleaf tree bleached pulp (filtered water degree 350 mlcsf) to prepare pulp slurry. Paper was manufactured from the pulp slurry obtained by a twin wire paper making machine, dried and machine calendar finished to give a raw paper of weighting 72 $g/m^2$.

Example 1

Additive 1 synthesized in Synthesis Example 1 was coated on the substrate prepared as described above and dried in a size press to 0.8 g/m² as dry solids, and calendar finishing was performed to manufacture the inkjet recording medium of Example 1. In the coating, water was added to adjust the resin concentration so as to suitably adjust the adhesion amount on the substrate.

Examples 2–8 and Comparative Examples 1–4

An inkjet recording medium was manufactured exactly as described in Example 1, except that Additives 2–8 synthesized in Synthesis Examples 2–8 and Additives 9–12 manufactured in Comparative Synthesis Examples 1–4, were used instead of Additive 1 used in Example 1.

Comparative Example 5

An inkjet recording medium was manufactured exactly as described in Example 1, except that water was used for coating instead of Additive 1 used in Example 1.

Tests
Transmittance Measurement

Regarding the additives synthesized in Synthesis Examples 1–8 and Comparative Shnthesis Examples 1–4, the degree of mutual interaction between the ink (commercial name: Scitex 1007, Scitex black ink; Scitex 1011, Scitex red ink; Scitex 1012, Scitex blue ink; BC 121, Canon color printer ink) and the additive was evaluated by measuring the transmittance using a Shimadzu Autospectrophotometer UV3100PC (measurement wavelength: 300–800 nm, slit width: 2 nm, sampling interval: 0.5 nm). 5 μl of ink was dripped into 0.5 ml of additive solution adjusted to 0.5% concentration, and after shaking the mixture well, it was left standing overnight. Next, it was filtered through a filter of 0.2 μm pore size, and the transmittance of the filtrate was measured. If the substance obtained by mutual interaction of the additive and dye is highly insoluble, it precipitates and is filtered off. It may therefore be determined that the water resistance of the recording medium containing the additive will be higher, the higher the transmittance of the filtrate. These results are shown in Table 1.

Inkjet Recording Suitability Test

The inkjet recording media prepared in Examples 1–8 and Comparative Examples 1–5 were used to record images using a multicolor inkjet printer (commercial name: BJC-400J, Canon) and a monochrome inkjet printing system (commercial name: 6420J, SciTex Japan), and the results evaluated by the following methods are shown in Table 2.

(Image Water Resistance)

30 seconds after recording with the printer, the image was immersed in deionized water at 20° C. for 30 seconds, and after allowing to stand and drying, the degree of blurring was visually evaluated. In the test results, ⊚ indicates a good result with no blurring, ○ indicates that some blurring was observed but was practically insufficient to cause a problem, Δ indicates that blurring was obserbed and sufficient to cause a problem, and x indicates a poor result with much blurring.

Resolution

Fine lines were recorded with the printer, and visually evaluated. In the test results, ⊚ indicates a good result with little blurring and narrow lines, ○ indicates slight blurring and slightly wider lines but practically insufficient to cause a problem, Δ indicates blurring and wider lines sufficient to cause a problem, and x indicates a poor result with blurring and wide lines.

TABLE 1

| | Transmissometry result | | | | | |
|---|---|---|---|---|---|---|
| | Mole ratio secondary amine/ ammonia/ | Transmittance | | | | |
| Additive | epichlorohydrin/ crosslinking agent | 1007 | 1011 | 1012 | BC 121 (black) | Note |
| Synthesis Example1 (Additive1) | 1:0.11:1.14:0.0002 | 97% | 93% | 92% | 99% | |
| Synthesis Example2 (Additive2) | 1:0.11:1.14:0.0003 | 97% | 94% | 95% | 99% | |
| Synthesis Example3 (Additive3) | 1:0.11:1.14:0.0003 | 96% | 93% | 95% | 96% | |
| Synthesis Example4 (Additive4) | 1:0.11:1.14:0.0003 | 96% | 90% | 94% | 96% | |
| Synthesis Example5 (Additive5) | 1:0.11:1.11:0.0007 | 97% | 93% | 94% | 99% | |
| Synthesis Example6 (Additive6) | 1:0.25:1.25:0.0008 | 95% | 90% | 94% | 99% | |
| Synthesis Example7 (Additive7) | 1:0.25:1.25:0.001 | 95% | 90% | 93% | 98% | |
| Synthesis Example8 (Additive8) | 1:1:2:0.003 | 92% | 90% | 90% | 98% | |
| Comparative Synthesis Example1 (Additive9) | 1:0.11:1.14:0 | 90% | 18% | 51% | 33% | |
| Comparative Synthesis Example2 (Additive10) | 1:0:1:0 | 95% | 18% | 68% | 80% | |
| Comparative Synthesis Example3 (Additive11) | — | 80% | 20% | 40% | 20% | *1 |
| Comparative Synthesis Example4 (Additive12) | — | 34% | 6% | 3% | 16% | *2 |

*1: 2-2-azobis-(2-amidino propane) crosslinked substance from monoallylamine polymer
*2: mole ratio: DCDA:DETA:NH₄Cl = 1:0.7:0.22

TABLE 2

| Ink jet recording aptitude evaluation | | |
|---|---|---|
| | Image durability | Resolution |
| Example 1 | ⊚ | ⊚ |
| Example 2 | ⊚ | ⊚ |
| Example 3 | ⊚ | ⊚ |
| Example 4 | ⊚ | ⊚ |
| Example 5 | ⊚ | ⊚ |
| Example 6 | ○ | ⊚ |
| Example 7 | ○ | ⊚ |
| Example 8 | ○ | ○ |
| Comparative Example 1 | Δ | ○ |
| Comparative Example 2 | Δ | ○ |
| Comparative Example 3 | x | ○ |
| Comparative Example 4 | x | Δ |

TABLE 2-continued

Ink jet recording aptitude evaluation

|  | Image durability | Resolution |
|---|---|---|
| Comparative Example 5 | x | ○ |

According to this invention, by incorporating an additive having a cationic resin as principal component, this resin being obtained by the reaction of a secondary amine, ammonia, an epihalohydrin and a crosslinking agent as required components, in the surface and/or interior of a substrate of a recording medium; an inkjet recorded image which has water resistance, little blurring and high resolution, can be obtained.

Industrial Field of Application

By using the additive of this invention, a recording medium suitable for multicolour recording by the ink-jet recording method, giving little shift in hue, high resolution and excellent image reproducibility including color reproducibility can be obtained. Further, the additive of this invention prevents fading of dyed yarn or cloth when water-soluble dyes are used.

What is claimed is:

1. An inkjet recording medium, obtained by coating an additive on the surface of a substrate or introducing the additive to the interior of the substrate, wherein the additive comprises a cationic resin as a principal component, which resin is obtained by the reaction of at least a secondary amine, ammonia, an epihalohydrin and a crosslinking agent comprising at least one compound with two or more aldehyde groups, epoxy groups or isocyanate groups, said resin having a cross-linked structure.

2. The inkjet recording medium as defined in claim 1, wherein (lie substrate is a coated paper comprising a recording layer suitable for recording by a water-based ink on the substrate surface.

3. The inkjet recording medium as defined in claim 2 wherein the coated paper is impregnated by a solution containing the additive having the cationic resin as a principal component.

4. The inkjet recording medium as defined in claim 2, wherein the coated paper is manufactured from a pulp slurry containing the additive having the cationic resin as a principal component.

5. An ink jet recording medium as defined in claim 1, wherein the weight average molecular weight of the cationic resin obtained is 10,000–500,000.

6. An inkjet recording medium as defined in claim 1, wherein the ratio of secondary amine: ammonia: epihalohydrin: crosslinking agent to prepare the cationic resin is 1: (0.01–2): (0.5–2.5): (0.00005–0.5).

7. An ink jet recording medium as defined in claim 1, wherein the crosslinking agent comprises at least one multifunctional epoxy compound.

8. An inkjet recording medium as defined in claim 1 wherein the secondary amine is a dialkylamine, a dimethylamine, a diethylamine, or an ethyl monomethylamine.

9. An inkjet recording medium as defined in claim 1, wherein the epihalohydrin is epichorohydrin, epiiodohydrin, or epibromohydrin.

10. An inkjet recording medium according to claim 1, wherein the substrate is a sleet substrate.

11. The inkjet recording medium as defined in claim 1, wherein the substrate is paper.

12. The inkjet recording medium as defined in claim 11, wherein the paper is impregnated by a solution containing the additive having the cationic resin as a principal component.

13. The inkjet recording medium as defined in claim 11, wherein the paper is manufactured from a pulp slurry containing the additive having the cationic resin as a principal component.

14. An inkjet recording medium as defined in claim 1, wherein the ratio of secondary amine: ammonia: epihalohydrin: crosslinking agent to prepare the cationic resin is 1: (0.02–1): (0.8–2.2): (0.0001–0.01).

15. An inkjet recording medium according to claim 1, wherein the resin is obtained by mixing a secondary amine and ammonia together, followed by the addition of an epihalohydrin and a cross-linking agent.

16. An inkjet recording, medium according to claim 1, wherein the additive consists essentially of a cationic resin.

17. An inkjet recording medium according to claim 1, wherein the additive consists of a cationic resin.

18. An inkjet recording medium, obtained by coating an additive on the surface of a substrate or introducing the additive to the interior of the substrate, wherein the additive comprises a cationic resin as a principal component, which resin is obtained by the reaction of at least a secondary amine, ammonia, an epihalohydrin and a crosslinking agent comprising polyethylene glycol diglycidyl ether, polypropylene glycol diglycidyl ether, polytetramethylene glycol diglycidyl ether, polybutadienie diglycidyl ether, resorcinol diglycidyl ether, neopentylglycol diglycidyl ether, 1,6-hexanediol diglycidyl ether, bisphenol A diglycidyl ether, bisphenol F diglycidyl ether, bisphenol A polyethylene glycol diglycidyl ether, bisphenol A polypropyleneglycol diglycidyl ether, hydrated bisphenol A diglycidyl ether, hydroquinone diglycidyl ether, terephthalic acid diglycidyl ether, sorbitol polyglycidyl ether, polyglycerol polyglycidyl ether, pentaerythritolpolyglycidyl ether, diglyceroylpolyglycidyl ether, glycerolpolyglycidyl ether, or trimethylolpropane polyglycidyl ether, said resin having a cross-linked structure.

19. An inkjet recording medium as defined in claim 18, wherein the ratio of secondary amine: ammonia: epihalohydrin: crosslinking agent to prepare the cationic resin is 1: (0.02–1): (0.8–2.2): (0.0001–0.01).

20. An inkjet recording medium according to claim 18, wherein the resin is obtained by mixing a secondary amine and ammonia together, followed by the addition of an epihalohydrin and a cross-linking agent.

21. An inkjet recording medium according to Claim 18, wherein the additive consists essentially of a cationic resin.

22. An inkjet recording medium according to claim 18, wherein the addictive consists of a cationic resin.

* * * * *

UNITED STATES PATENT AND TRADEMARK OFFICE
CERTIFICATE OF CORRECTION

PATENT NO. : 6,861,111 B1
DATED : March 1, 2005
INVENTOR(S) : Makoto Hasegawa

It is certified that error appears in the above-identified patent and that said Letters Patent is hereby corrected as shown below:

Title page,
Item [30], Foreign Application Priority Data, reads "11-090970" should read
-- 09970/99 --

Column 11,
Line 39, reads "lie" should read -- the --

Column 12,
Line 5, reads "sleet" should read -- sheet --
Line 25, reads "recording," should read -- recording --
Line 37, reads "polybutadienie" should read -- polybutadiene --
Line 61, reads "addictive"should read -- additive --

Signed and Sealed this

Seventh Day of June, 2005

JON W. DUDAS
*Director of the United States Patent and Trademark Office*